United States Patent [19]

Evans, Sr. et al.

[11] Patent Number: 5,131,714
[45] Date of Patent: Jul. 21, 1992

[54] GENERAL DELIVERY LOAD CARRYING VEHICLE

[75] Inventors: Robert B. Evans, Sr., Grosse Pointe Shores; Barry E. Woodrow, Birmingham; Joseph H. Craven, Walled Lake, all of Mich.

[73] Assignee: Evans Body Works Inc., Detroit, Mich.

[21] Appl. No.: 684,014

[22] Filed: Apr. 11, 1991

[51] Int. Cl.⁵ .............................................. B62D 23/00
[52] U.S. Cl. .................................... 296/183; 296/203; 296/205; 180/12; 180/298; 180/299; 180/58
[58] Field of Search ................... 180/12, 298, 299, 58; 296/203, 205, 183

[56] References Cited

U.S. PATENT DOCUMENTS

| | | | |
|---|---|---|---|
| 2,172,831 | 9/1939 | Carlson | 296/183 |
| 2,409,181 | 10/1946 | Bagley et al. | 180/12 |
| 2,480,047 | 8/1949 | Reinhard | 180/12 |
| 2,751,992 | 6/1956 | Nallinger | 180/12 X |
| 3,834,575 | 9/1974 | Carr | 296/183 X |
| 4,978,164 | 12/1990 | Nakamura et al. | 296/203 X |
| 4,991,897 | 2/1991 | Karapetian | 296/209 X |

FOREIGN PATENT DOCUMENTS

| | | | |
|---|---|---|---|
| 3333038 | 3/1985 | Fed. Rep. of Germany | 296/203 |
| 240334 | 4/1946 | Switzerland | 296/183 |
| 465355 | 10/1975 | U.S.S.R. | 296/203 |
| 466214 | 5/1937 | United Kingdom | 180/12 |
| 2220172 | 1/1990 | United Kingdom | 296/205 |

OTHER PUBLICATIONS

Automotive and Aviation Industries, Feb. 1, 1947, p. 44, "Linn Delivery Coach".
Automotive and Aviation Industries, Oct. 1946, p. 44 "Knock-Down All-Aluminum Bodies".

*Primary Examiner*—Dennis H. Pedder
*Attorney, Agent, or Firm*—Barnes, Kisselle, Raisch, Choate, Whittemore & Hulbert

[57] ABSTRACT

A general delivery load carrying vehicle comprising a unitized load and stress bearing monocoque body and a front wheel drive engine unit. The body comprises a base floor, side walls and a top wall or roof structurally interconnected to support the vertical and torsional forces on the vehicle. The base floor has a length sufficient to provide a cab area and a load carrying area. The base floor is such as to provide a floor in the cab area that is at the same height throughout and at a level such that persons entering the vehicle may step into the vehicle directly in a single step without the need for additional structural steps or running boards. The side walls have openings adjacent the cab area for entrance and exit and one end wall defines structural pillars for receiving the windshield. The front wheel engine drive module comprises a drive unit frame on which the drive components are mounted including an engine, front wheel, drive axle, cooling components, steering assembly, transmission and drive transfer case. The drive unit frame is mounted on the front end of the base floor such that forces due to travel along the road and due to loads are absorbed by the combined strength of the base floor, side walls and top wall. Rear wheels and suspension components are mounted on the body.

6 Claims, 14 Drawing Sheets

GENERAL DELIVERY LOAD CARRYING VEHICLE

This invention relates to load carrying vehicles and particularly load carrying vehicles of intermediate size known as general delivery vehicles such as utilized for delivery of lighter goods, carrying a limited number of passengers, or emergency use such as ambulances.

BACKGROUND AND SUMMARY OF THE INVENTION

In order to carry loads that are normally contemplated in delivery of goods in individual quantities or passengers, it has long been thought that it is necessary to have a chassis including a frame that extends the entire length of the vehicle and supports the engine drive unit, the cab unit and the load bearing body unit which are provided on such a frame. As a result, such units necessitate having heavy steel frame members extending at a distance above the road such that the loads must be placed into the vehicle at an elevated height and removed from an elevated height. Additional devices such as steps or running boards may be needed. Alternatively, auxiliary lifts such as hydraulic lifts are utilized for raising and lowering the load. Further, the elevated height of the frame necessitates that the operator of the vehicle step up or step down a substantial distance.

The use of a chassis including frame members running the entire length of the vehicle also adds substantially to the cost because the frame is heavy due to the size and the weight of the components. The elevated height of the cab and load axle limit the cubic size of the load area and therefore the capacity of the vehicle.

Accordingly, among the objectives of the present invention are to provide an automotive vehicle for carrying loads which obviates the aforementioned difficulties; which does not require a separate chassis frame, cab and body; which is constructed such that the load bearing area and cab area are relatively low in height from the ground; which is light in weight; and which can be utilized for a variety of load carrying applications including delivery trucks, buses, ambulances and catering trucks.

In accordance with the invention, the vehicle results from mating a self-contained front wheel drive module with a monocoque designed body that eliminates the conventional vehicle chassis and its relatively high (30 inches or so from the ground) main frame rails.

The elimination of the conventional chassis allows several previously unattainable vehicle features to become possible and functional:

1. A low floor (14 or so inches from the ground), providing single step access and egress from the vehicle, for both the vehicle driver and the cargo loading and unloading;
2. By lowering the floor, a considerable volumetric capacity increase is made possible within the same "profile" as a vehicle constructed on a conventional chassis;
3. Due to the unique design of mating the front wheel drive module to the body of the vehicle, maintenance is dramatically simplified and the attendant "down time" is significantly reduced for the vehicle operator. The design target is for a drive/body system that would allow two trained mechanics to remove and replace the drive module within one (1) working day;
4. The monocoque construction of the vehicle body is designed to provide a relatively lower weight structure with long lived integrity, thus a relatively higher weight load capacity for comparable cost;
5. The front drive module is "packaged" to allow use of readily available gasoline or diesel engines and transmissions, as well as anticipated "alternative fuel" power trains;
6. The design target is to provide a finished vehicle that can be manufactured and profitably sold at a cost and price that is competitive with other "traditional" vehicles presently available on the market;
7. The use of aluminum extrusions and composites (i.e., fiberglass) allows for unique styling possibilities and a minimum of parts fabrication, thus the manufacturing process shall be relatively low in capital equipment requirements.

In accordance with the invention, a general delivery load carrying vehicle comprising a unitized load and stress bearing monocoque body and a front wheel drive engine unit. The body comprises a base floor, side walls and a top wall or roof structurally interconnected t support the vertical and torsional forces on the vehicle. The base floor has a length sufficient to provide a cab area and a load carrying area. The base floor is such as to provide a floor in the cab area that is at the same height throughout and at a level such that persons entering the vehicle may step into the vehicle directly in a single step without the need for additional structural steps or running boards. The side walls have openings adjacent the cab area and define structural pillars for receiving the windshield. The front wheel engine drive module comprises a drive unit frame on which the drive components are mounted including an engine, front wheels and drive axle, cooling components, steering assembly, transmission and drive transfer case. The drive unit frame is mounted on the front end of the base wall such that forces due to travel along the road and due to loads are absorbed by the combined strength of the base floor, side walls and top wall. Rear wheels and suspension components are mounted on the body.

More specifically, the automotive vehicle embodying the invention comprises a structure wherein the base floor has spaced portions at the front end thereof defining an open space into which the drive unit frame of a front wheel engine drive module extends and is fastened to the base floor and firewall structures. In one form, the base floor comprises a plurality of longitudinally and transversely extending members connected to one another. Similarly, the side walls comprise a plurality of upper and lower longitudinally extending members and vertical members which are structurally interconnected to the base wall at the lower ends of the side walls. Structural components are interconnected to the top walls of the side walls to form a top wall.

DESCRIPTION OF THE DRAWINGS

FIG. 2A is a rear perspective view of the load carrying vehicle.

DESCRIPTION

Referring to FIGS. 1A, 1B, 2 and 3, the load carrying vehicle embodying the invention comprises a front wheel drive engine module 30 that is removably mounted on a unitized load and stress bearing body 31. The front wheel engine drive module 30 includes a drive unit module including a frame 32 on which the drive components are mounted such as an engine, cooling components, transmission, drive axle, wheels and steering gear as well as a plastic tilt hood hinged at its front end to tilt forward. The drive unit is removably connected to the unitary body 31, as presently described.

Figure 3:
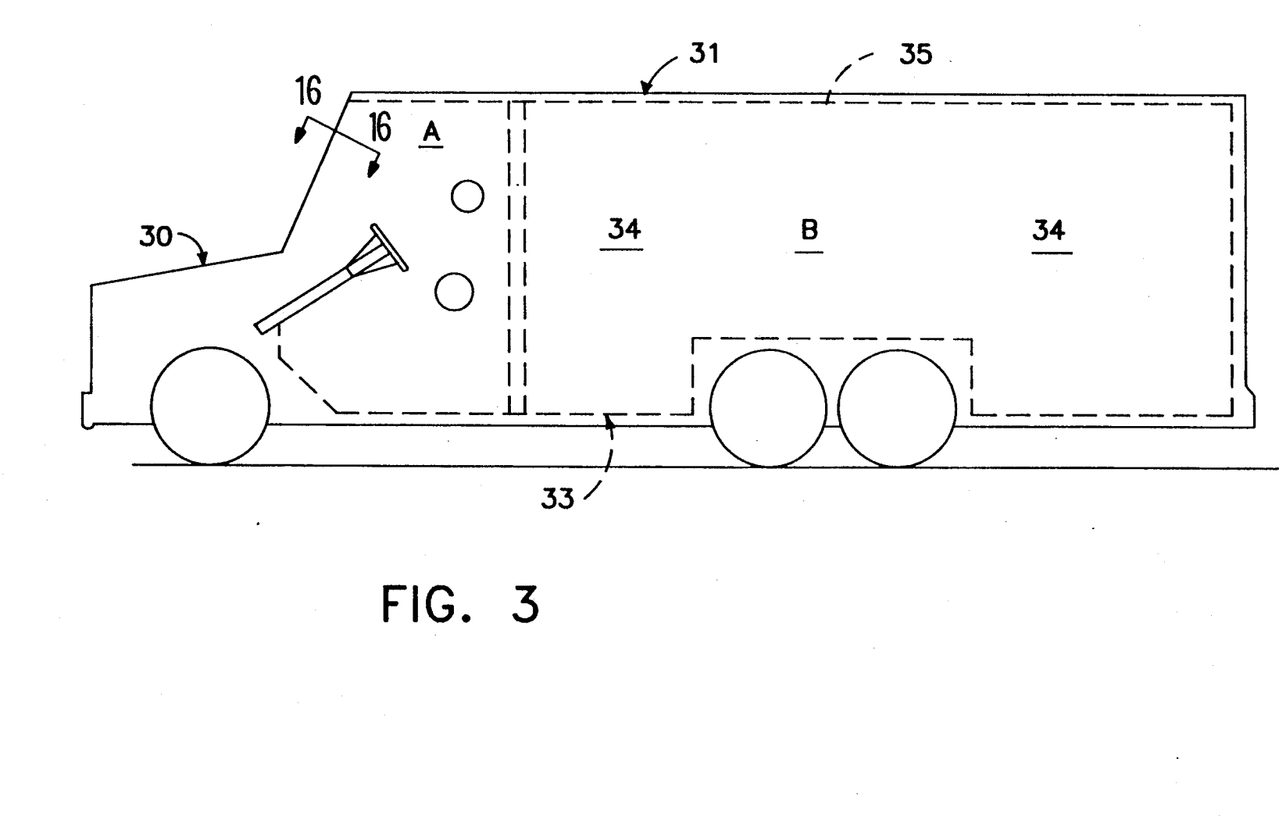
FIG. 3 is a partly diagrammatic side elevational view of the vehicle.

The load and stress carrying body 31 comprises a base floor 33, side walls 34 and a top wall 35 structurally interconnected to form a monocoque body and to support the loads on the base floor 33. The body 31 has a length sufficient to provide a cab area A above the road and a load carrying area B (FIG. 3). The height of the base floor 33 is such as to provide a floor in the cab area that is at the same height throughout and at a level such that persons entering the vehicle may step into the vehicle directly in a single step without the need for additional structural steps or running boards. The side walls 34 have openings adjacent the cab area and define structural pillars for receiving the windshield, as presently described. The front wheel engine drive module 30 is mounted on the front end of the base floor such that vertical and torsional forces due to travel or loads are absorbed by the combined strength of the monocoque body including the base floor, side walls and members interconnecting them to define a top wall or roof.

The expression load and stress body as used herein is utilized to define the structure comprising the base floor 33, side walls 34 and top wall interconnected in such a manner that the vertical and torsional forces due to travel or loads are absorbed by the combined strength of the interconnected base floor 33, side walls 34 and top wall member interconnecting them.

Figure 4:
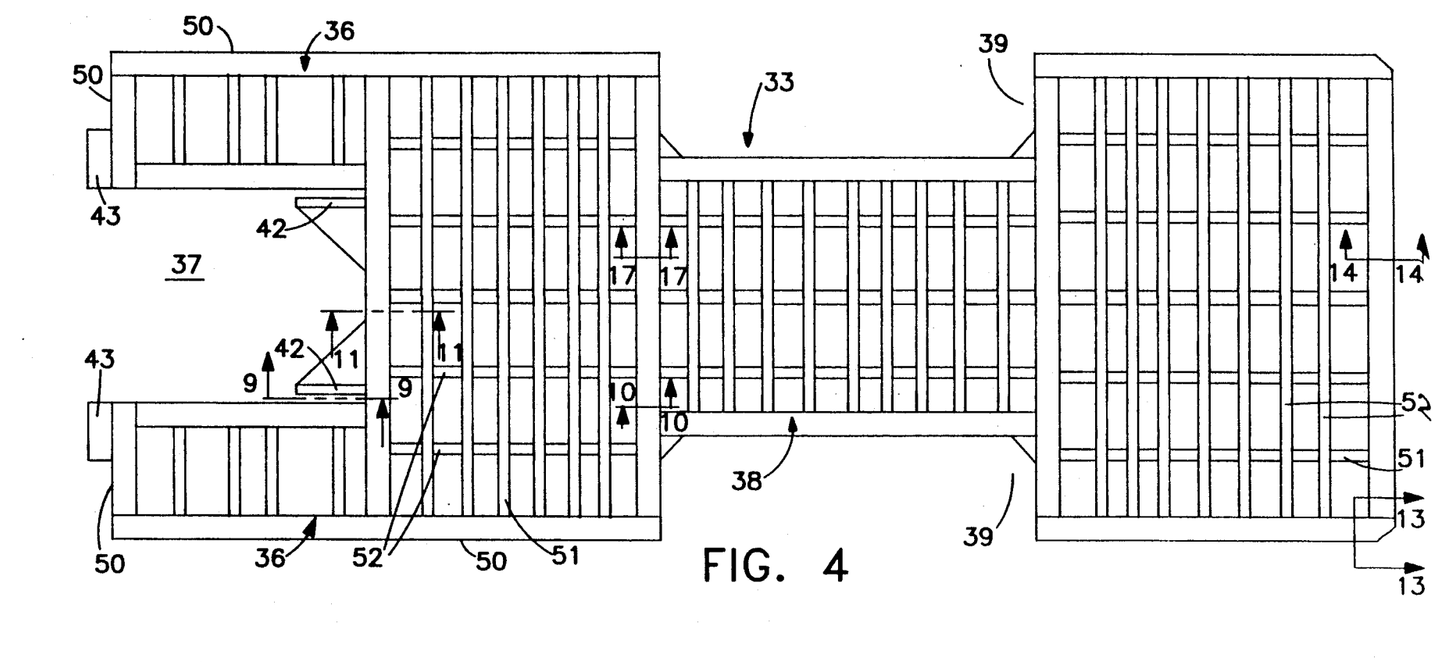
FIG. 4 is a plan view of the base wall of the body of the vehicle.

Referring to FIG. 4, the automotive vehicle embodying the invention comprises a structure wherein the base floor 33 has spaced portions 36 at the front end thereof defining an open space 37 at the front end of the base floor 33 into which the front wheel engine drive module 30 extends and is fastened to the base floor, as presently described. The base floor 33 further includes a transversely reduced portion 38 intermediate the front and rear ends of the base floor 33 which is of lesser width than the remaining portions of the base floor to define spaces 39 forming wheel wells into which the rear wheels of the vehicle extend. The wheels are supported by suspension systems as are well known in the art. The spaces have a length sufficient to accommodate dual rear wheels or alternatively single tandem rear wheels. Thus, the floor 33 is flat defining a flat load space except at the locations of the wheel.

Figure 5:
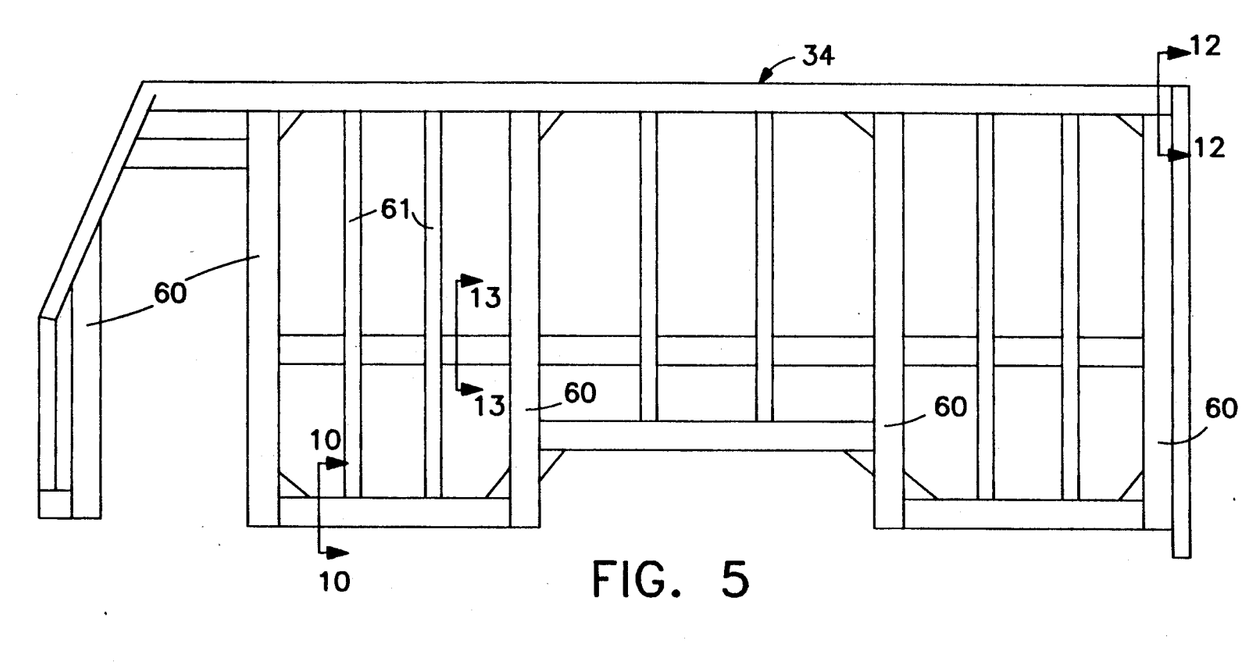
FIG. 5 is a side elevational view of a side wall body of the vehicle.
Figure 6:
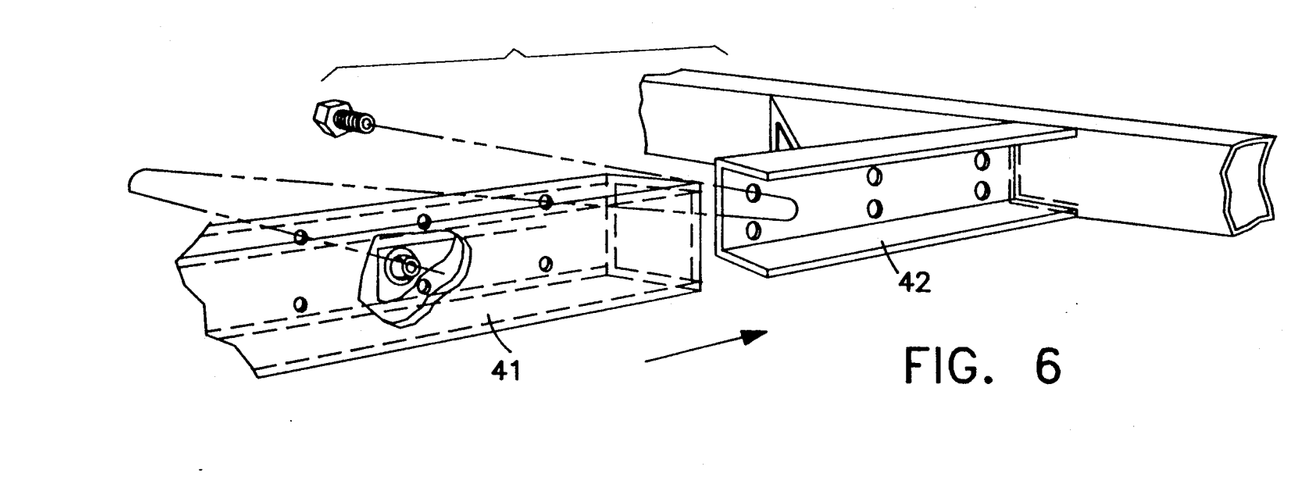
FIG. 6 is an exploded fragmentary perspective view of a portion of the vehicle.

Referring to FIG. 5, the side walls 34 are structurally interconnected to the base floor 33, as presently described and have a length corresponding substantially to the length of the base floor 33. The base floor 33 defines both a cab area and load area at the same level which in accordance with the invention is at a level such that an operator can step up one step to enter the cab area or lift a load directly to the load area, for example, at a level of 14 inches.

The upper ends of the side walls 34 are interconnected by transversely extending structural members to form a top wall or roof, as presently described to provide a unitary body that will absorb all the loads but at the same time will not require the usual and heavy longitudinally extending base frame as in prior art vehicles.

Figure 7:
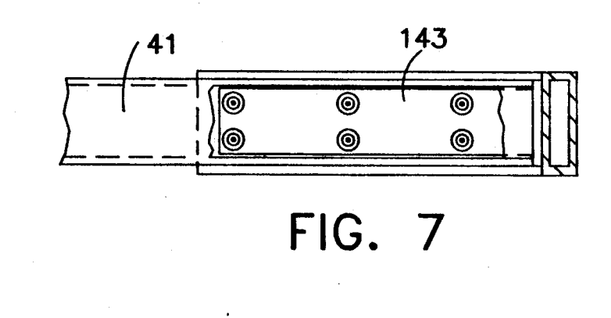
FIG. 7 is a fragmentary elevational view of the assembled portion of the vehicle shown in FIG. 6.
Figure 8:
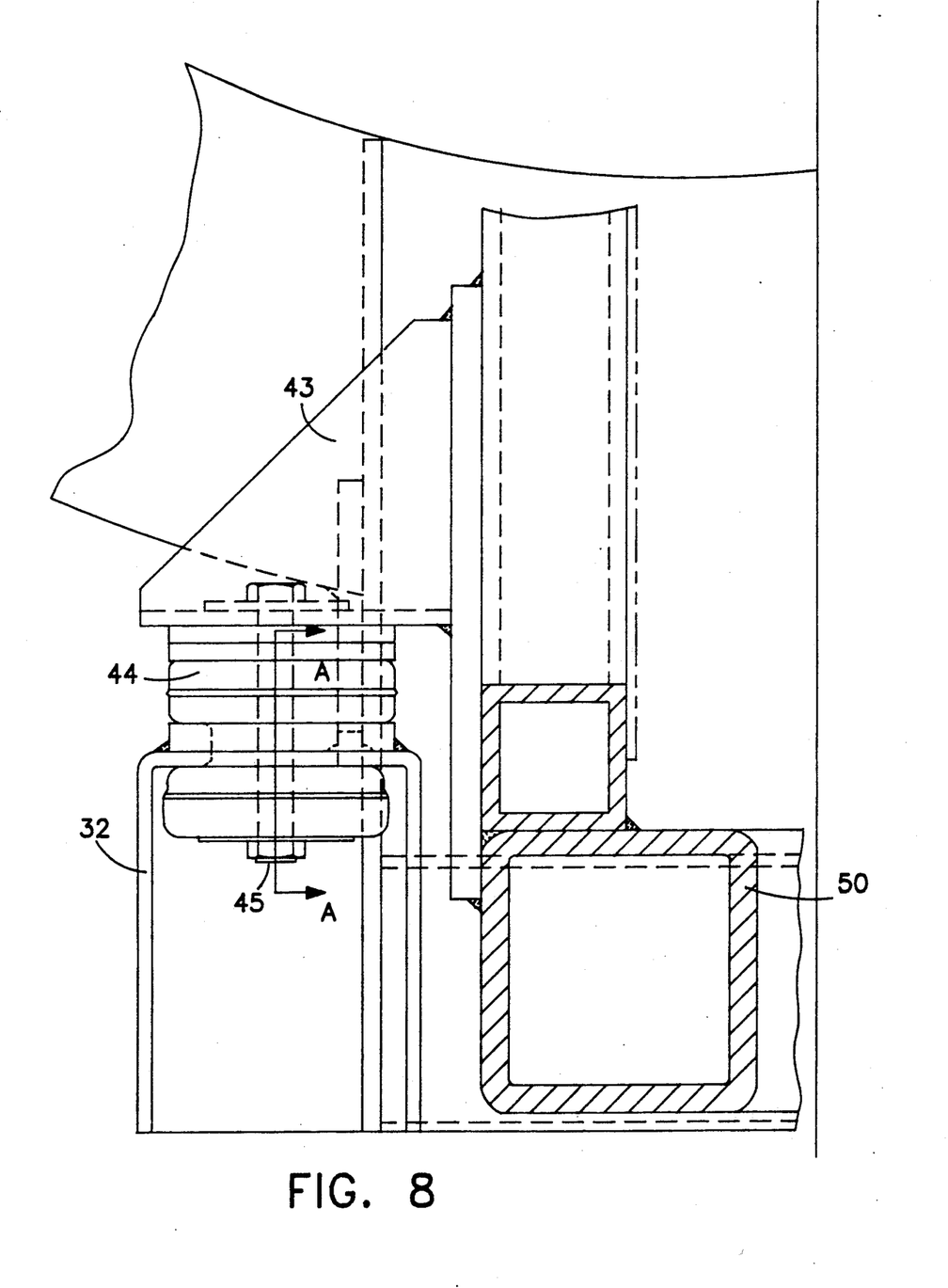
FIG. 8 is a fragmentary sectional view taken along the line 8—8 in FIG. 1.

Referring to FIGS. 2, 4 and 6-8, the interconnection between the unitary load and stress bearing body 31 and front wheel drive engine module preferably comprises spaced tubular projections 41 on the engine module frame 32 which are at a lower level than the remainder of the frame 32. The tubular projections 41 extend longitudinally rearwardly and telescopically receive spaced channels 42 that extend forwardly from the base of the space 37 of the frame 33 (FIG. 4). The projections and channels are bolted together (FIG. 7). Forwardly extending reinforced brackets 43 at the front end of the base floor 33 engage resilient shock absorbing blocks 44 on the upper surface of the engine frame 32. Bolts 45 extend through the brackets 43, block 44 and the frame 32.

By this arrangement, the engine drive module 30 can be readily assembled and disassembled for service. In order to disassemble the module 30 from the body 31, the bolted connections are removed and the service lines from the module are disconnected such as electrical, brake, fuel heating, and cooling lines. Valves or connectors are provided for ready disconnection and connection.

Sheet panels P of various types can be provided on the base floor, side walls and top of the body to enclose the body. The windshield is formed by the space between the front of the side walls. Rear doors can be provided at the rear of the body and side doors at the side of the body, herein shown as sliding doors as desired.

Referring to FIG. 4, in a preferred form, the base floor 33 comprises a plurality of tubular longitudinally and transversely extending members 50 defining the periphery of the base floor 33. The base floor also includes a plurality of longitudinally extending members 52 of lesser cross section and transversely extending tubular members 51 also of lesser cross section overlying the tubular members 51. The members 50, 51, 52 are interconnected as by fasteners or welding and preferably comprise aluminum extrusions. A typical connection between the members 50, 51, 52 are shown, for example, in FIG. 10, and comprises integral spaced flanges 53 on members 50 into which members 51, 52 extend and are fastened as by rivets 54. Alternatively, strong adhesives such as those of the epoxy type may be used without fasteners or with a lesser number of fasteners.

The side wall 34 similarly comprises vertical tubular members 60 defining the periphery of the side wall and vertical and horizontal Z-shaped members 61.

Figures 9, 10:
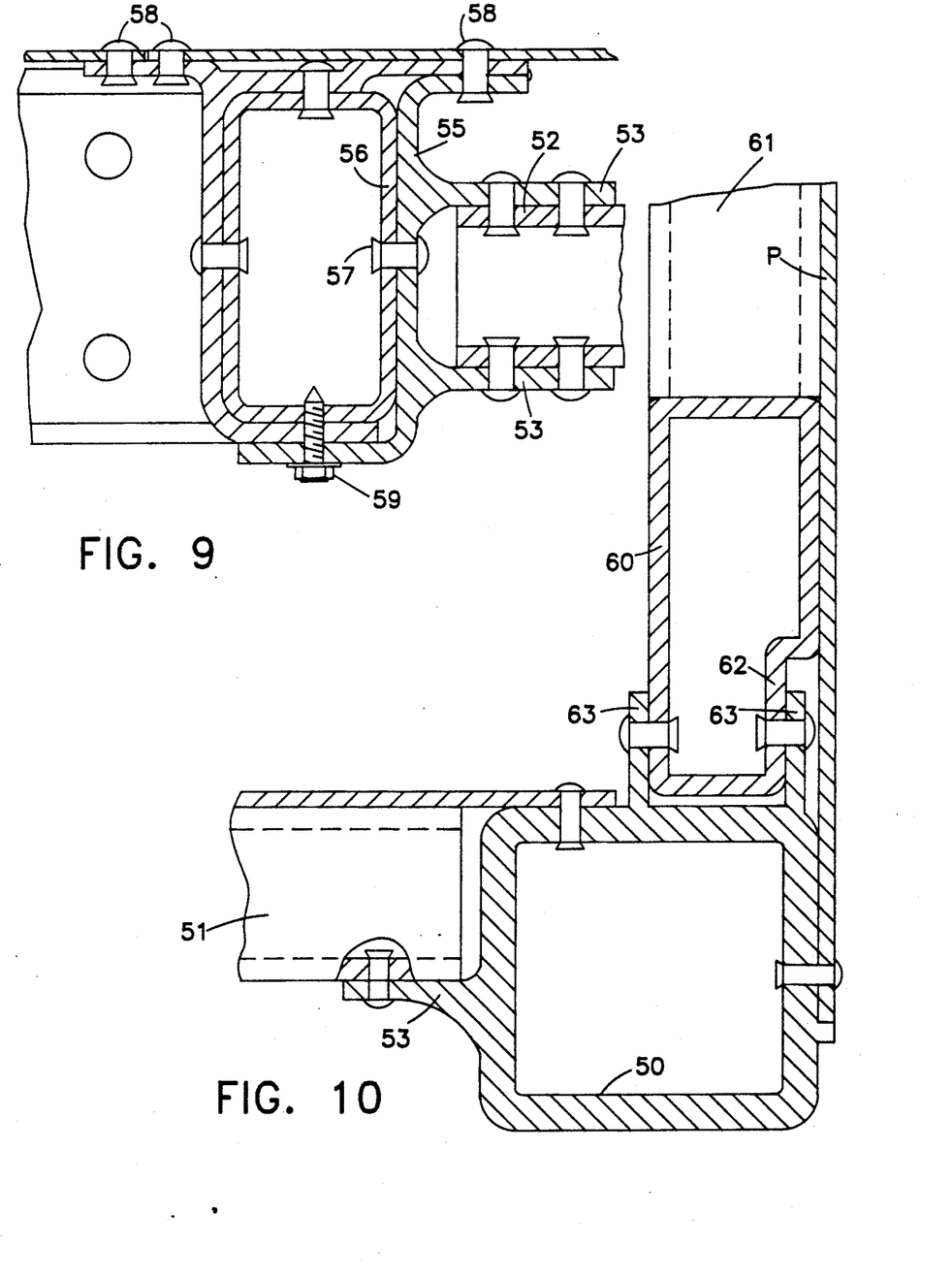
FIG. 9 is a fragmentary vertical sectional view taken along the line 9—9 in FIG. 4.
FIG. 10 is a fragmentary vertical sectional view taken along the line 10—10 in FIG. 4.
Figure 11:
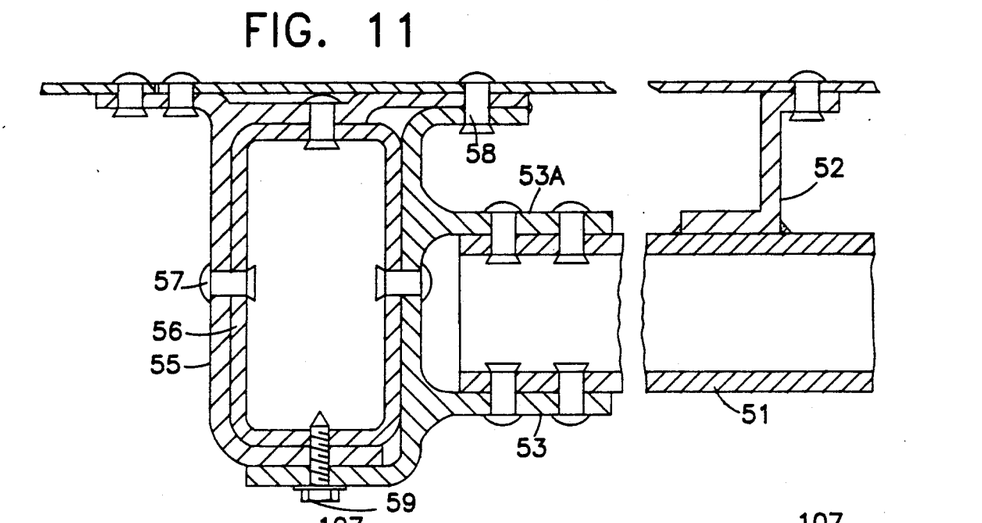
FIG. 11 is a fragmentary vertical sectional view taken along the line 11—11 in FIG. 4.

Referring to FIGS. 9 and 11 at the base of the opening 37 in the side frame 33, a reinforced cross sectional construction is utilized and comprises a transverse structural member 55, preferably of aluminum, that is tubular and reinforced by an inner tubular member 56 connected thereto by rivets 57. The tubular member 55 comprises three components that are joined by rivets 58 and fasteners 59. As in other tubular components, flanges 53 provide a juncture for structural members 51, 52. The inner tubular member 56 is preferably of a greater strength and may be made of steel coated with a material such as epoxy resin to inhibit corrosive action between the aluminum members 55 and steel members 56.

Each structural member 60 of a side wall is generally rectangular and preferably includes a portion 62 of reduced cross section for telescoping engagement with the flanges 63 of structural members 50 of the base wall, as shown in FIG. 10.

Figure 13:
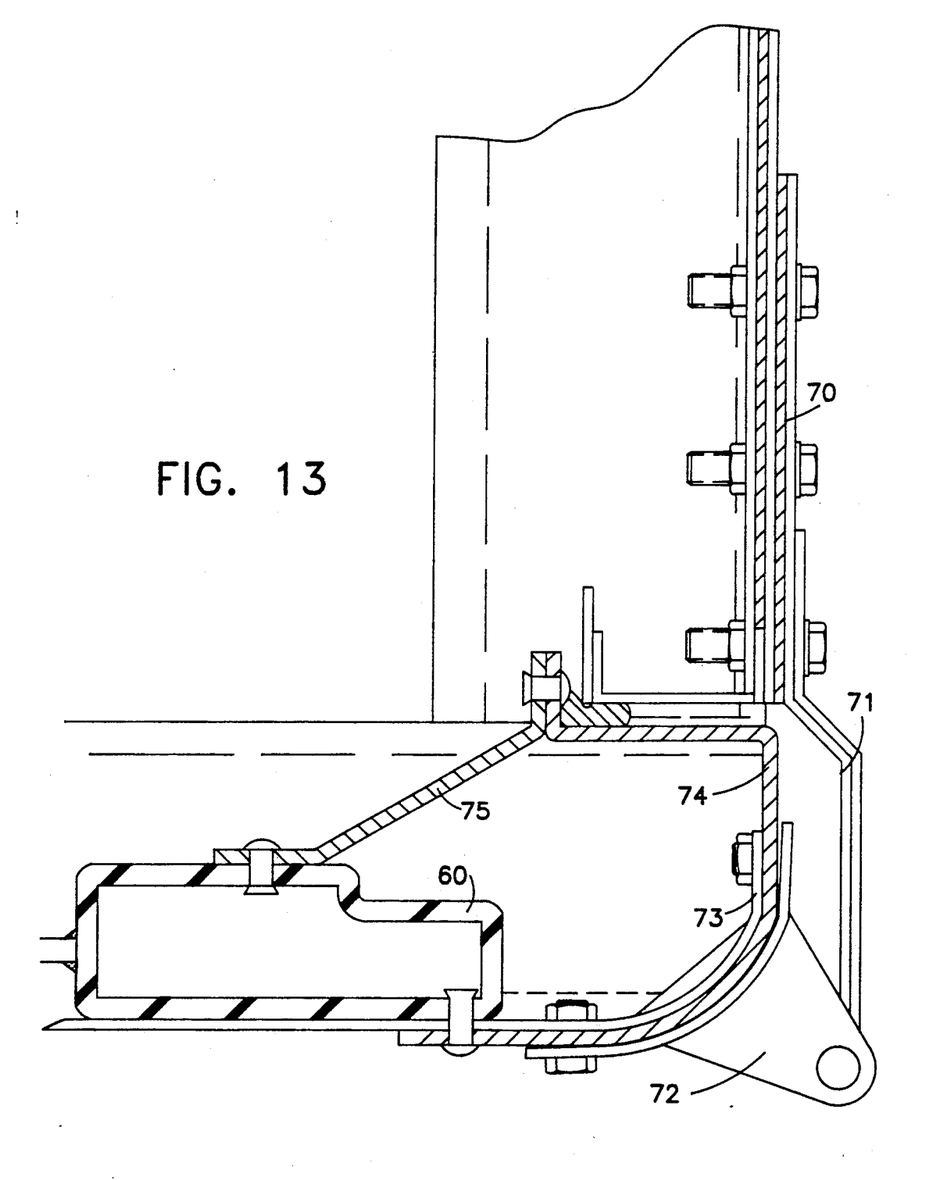
FIG. 13 is a fragmentary horizontal sectional view taken along the line 13—13 in FIG. 4.

Referring to FIG. 13, the vehicle construction facilitates mounting and positioning various kinds of doors at the rear of the vehicle. As shown in FIG. 13, a door 70 can be mounted by hinge members 71, 72, the member 72 being fixed by fasteners 73 to an extrusion 74 which in turn is mounted by rivets to a rear vertical structural member 60 and stabilized thereon by an extrusion 75 riveted and extending between the member 74 and the member 60.

Figure 14:
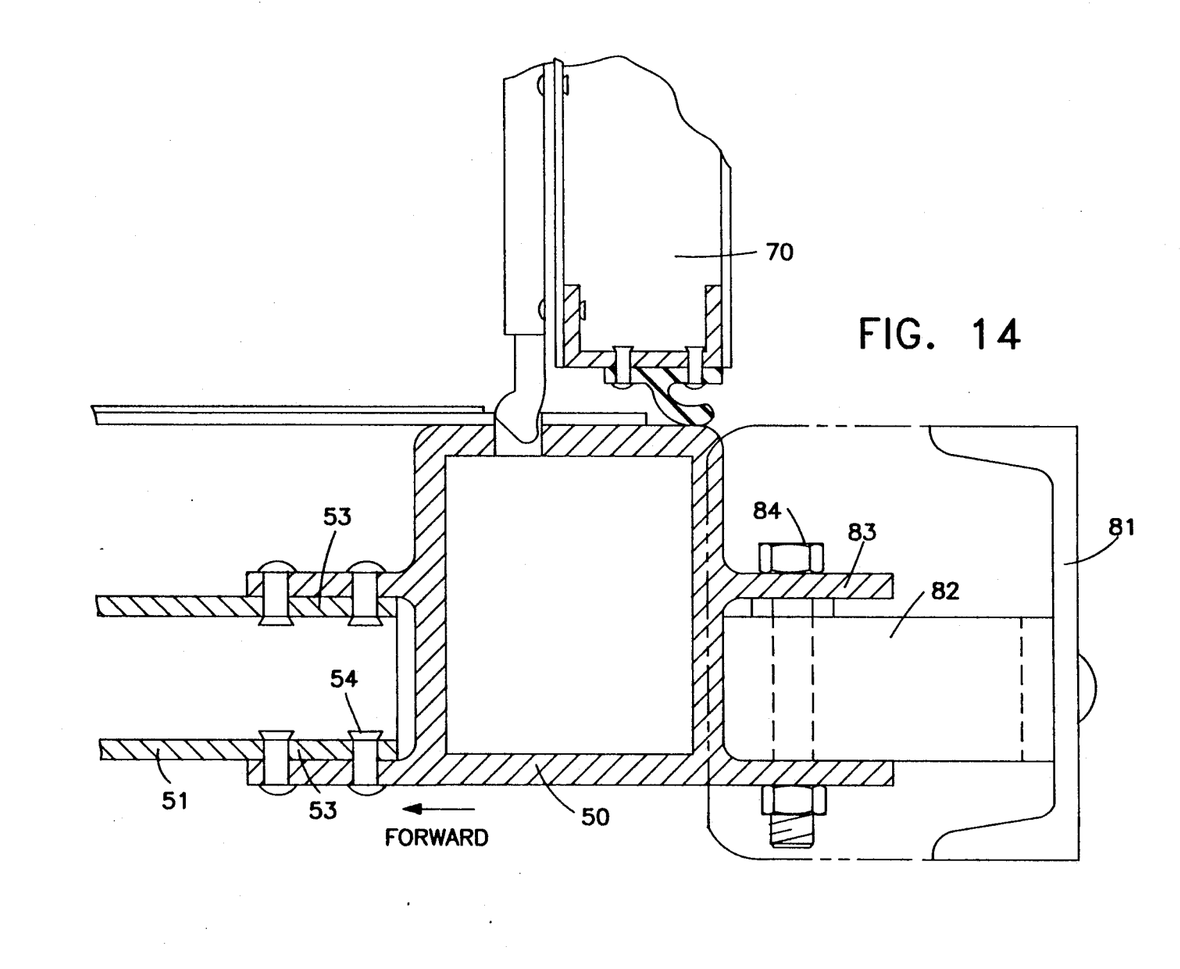
FIG. 14 is a fragmentary vertical sectional view taken along the line 14—14 in FIG. 4.

Referring to FIG. 14, the structure of the vehicle also readily facilitates the mounting of a rear bumper, herein shown as an elastomeric tubular horizontal member 50 fixed by rivets to a flange 81 that is, in turn, fixed to a resilient block 82 that has a portion extending between flanges 83 on a rear horizontal member 50 of the base frame with suitable mounting fasteners 84 holding the bumper in position.

Figure 15:
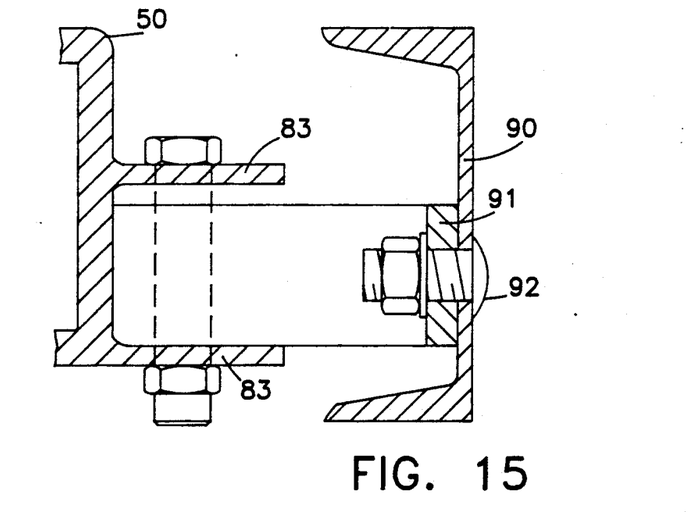
FIG. 15 is a fragmentary vertical sectional view of a modified form of bumper.

In the modified form of bumper shown in FIG. 15, the bumper comprises a metal channel 90 mounted on a resilient block 91 and held thereto by a fastener 92, the block 91 extending between the flanges 83 on a rear structural element 50.

Figures 12, 19:
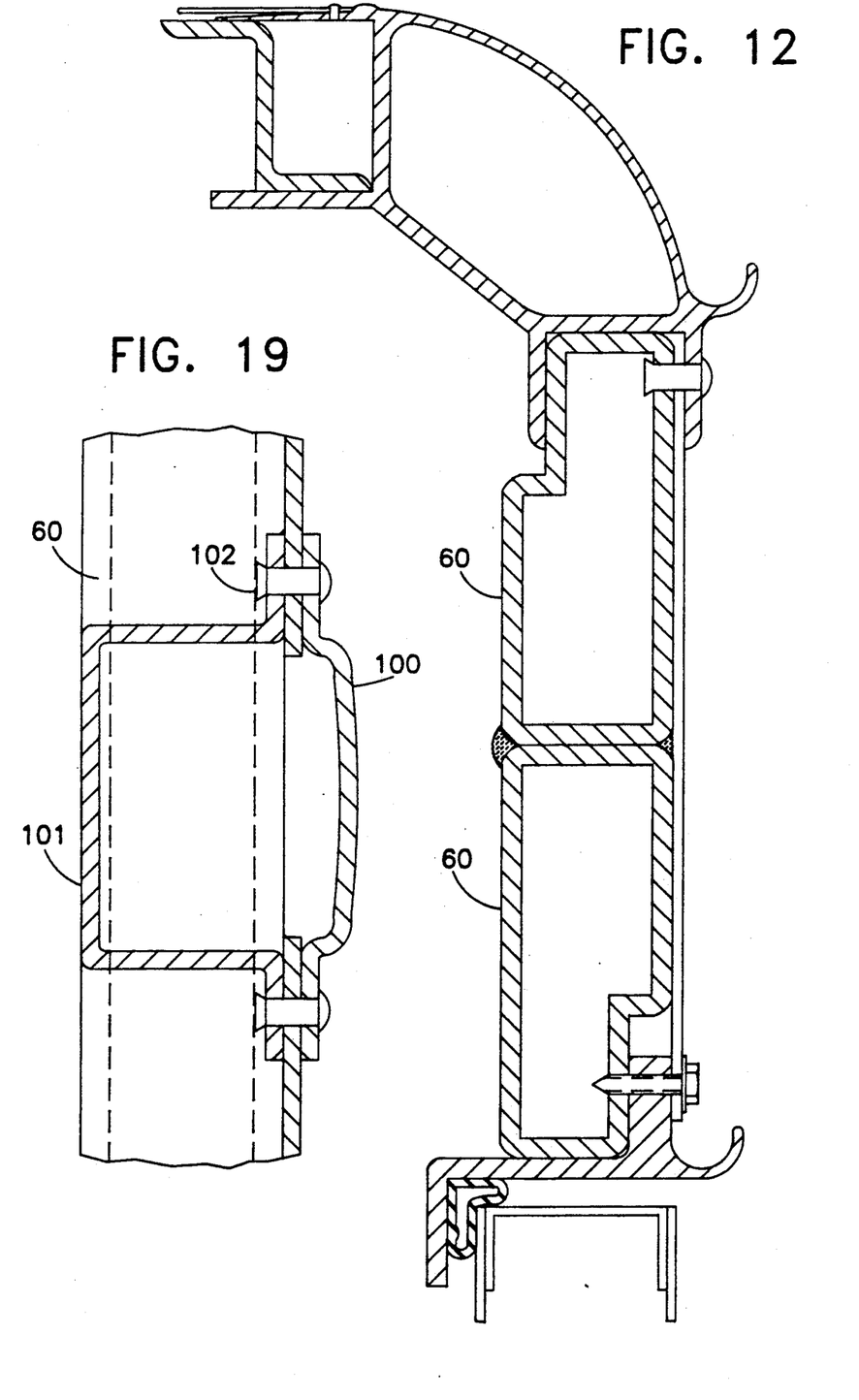
FIG. 12 is a fragmentary vertical sectional view taken along the line 12—12 in FIG. 5.
FIG. 19 is a fragmentary sectional view taken along the line 19—19 in FIG. 5.

The construction of the vehicle further facilitates the mounting of bumper or scraper strips 100 horizontally and extending longitudinally of the vehicle as shown in FIG. 19 wherein the strip 100 is fastened to the panel and a horizontal U-shaped reinforcing member 101 by rivets 102.

Figure 1A:
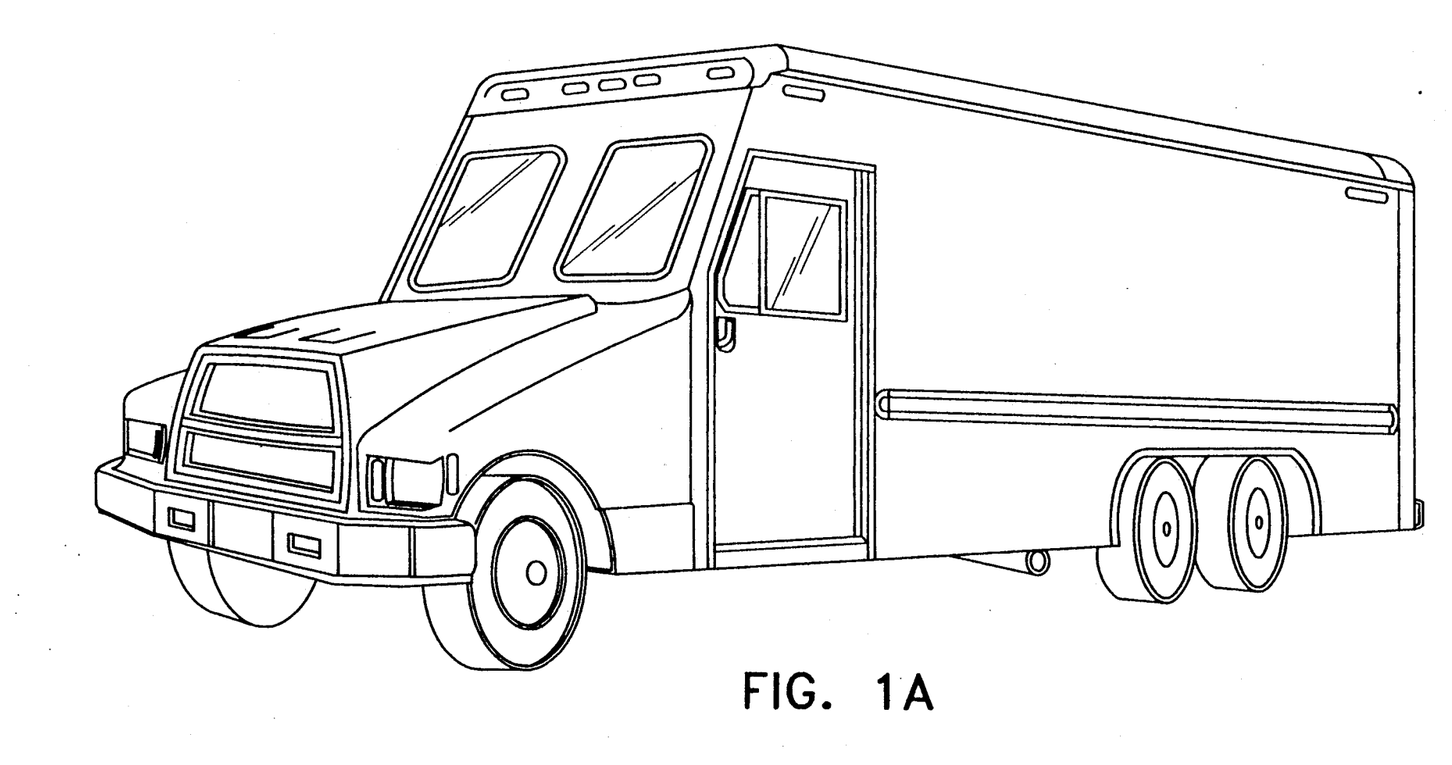
FIG. 1A is a front perspective view of the load carrying vehicle embodying the invention.
Figure 1B:
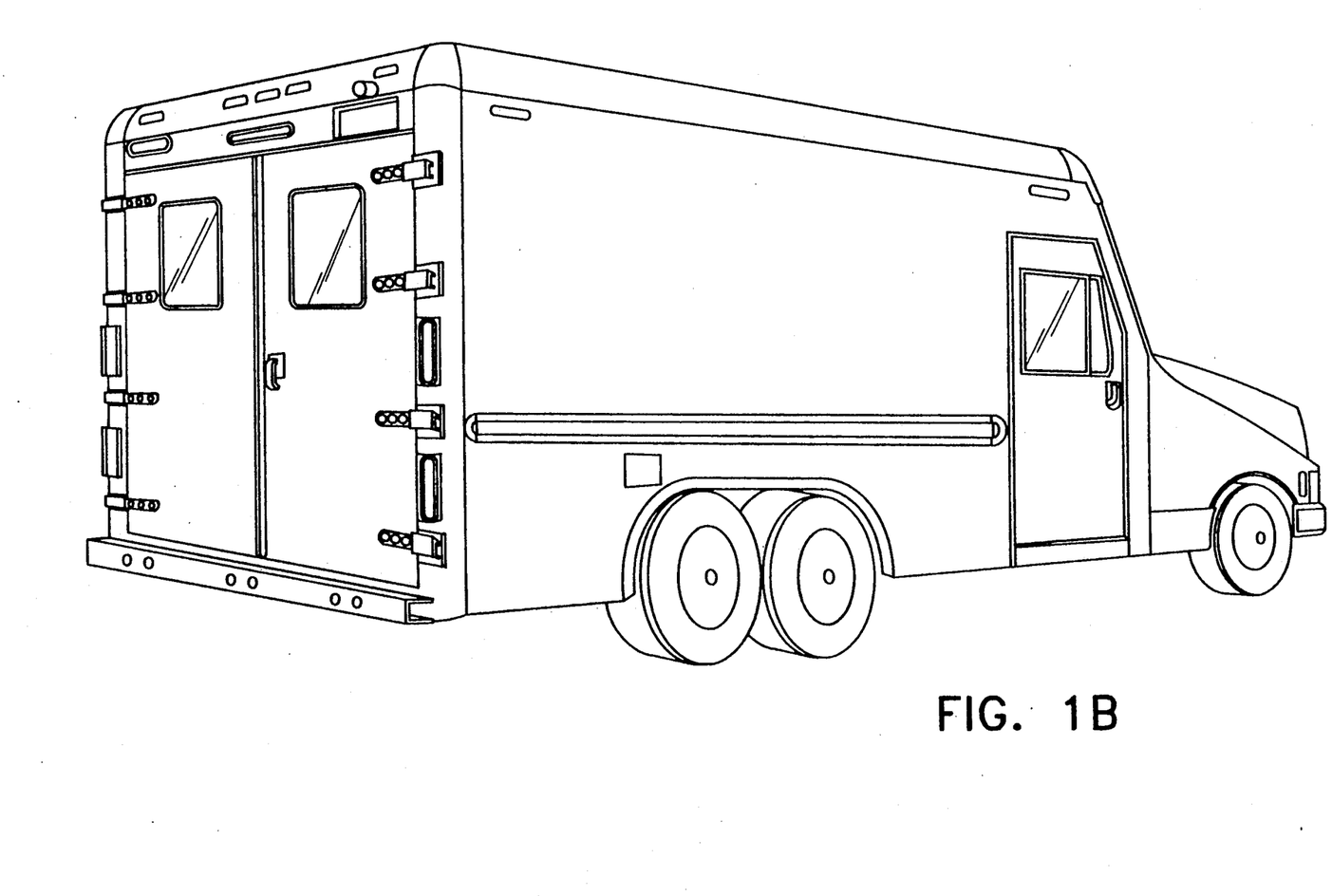
Figure 2:
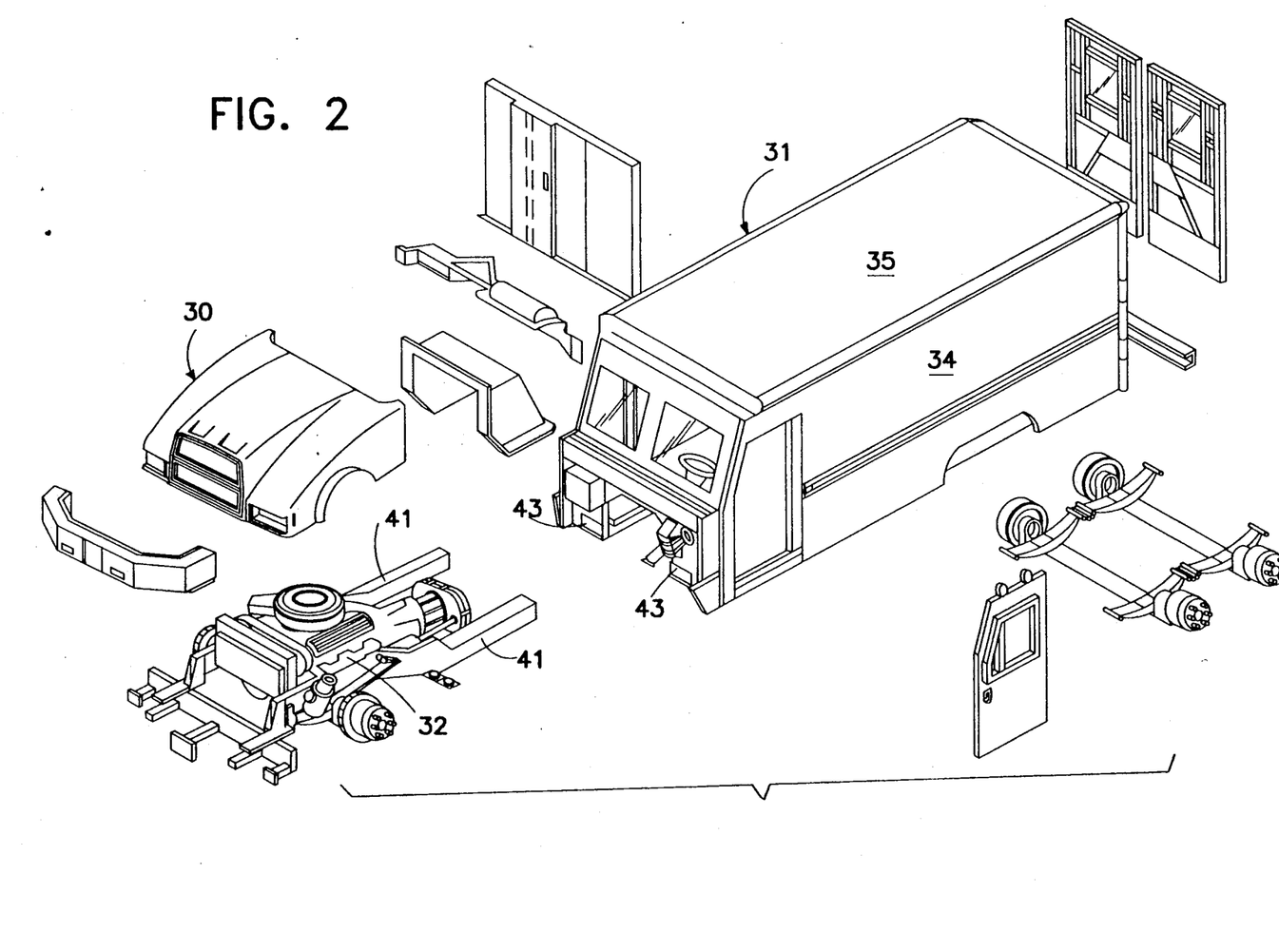
FIG. 2 is an exploded schematic view of the load carrying vehicle.
Figure 16:
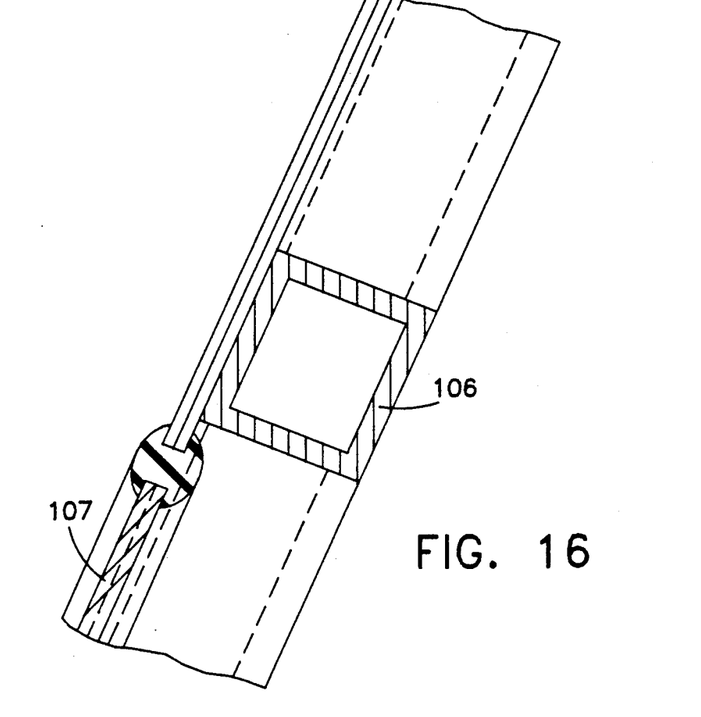
FIG. 16 is a fragmentary vertical sectional view of the windshield support.
Figure 17:
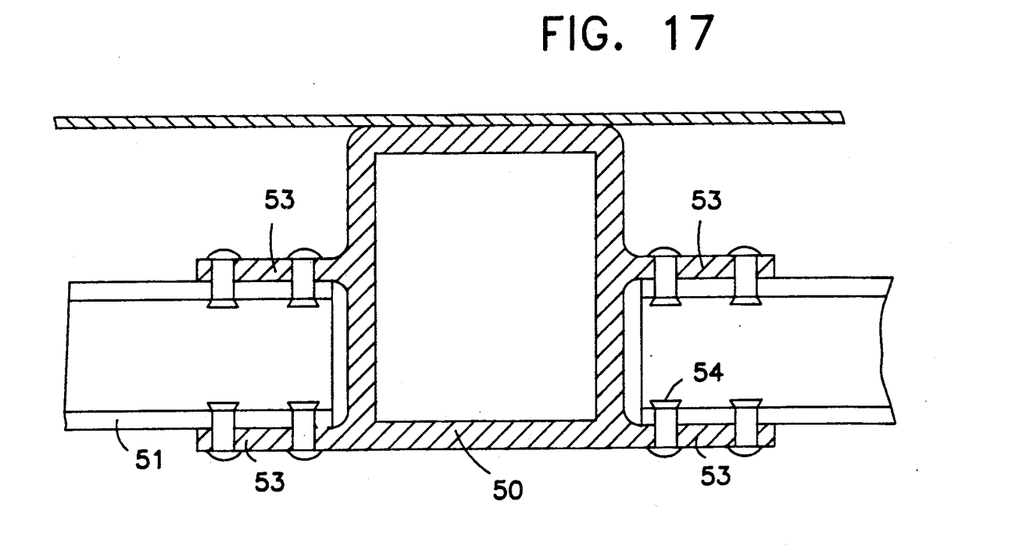
FIG. 17 is a fragmentary vertical sectional view taken along the line 17—17 in FIG. 4.
Figure 18:
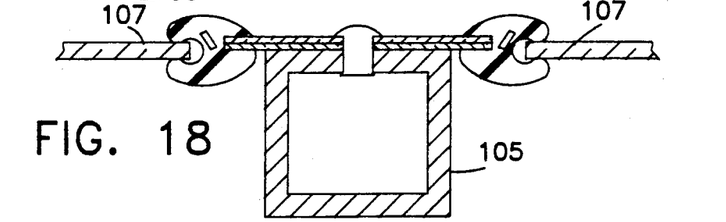
FIG. 18 is a fragmentary horizontal sectional view of the windshield support.

Referring to FIGS. 1A, 16 and 18, the front of the load and stress bearing body comprises a vertical and horizontal pillars 105 defining two openings for receiving a windshield.

Referring to FIG. 3, in a delivery truck example, the vehicle comprises the following dimensions.

| | |
|---|---|
| Floor height above road | 14.5" |
| Overall height | 109" |
| Overall length | 321" |
| Load area length | 193" |
| Load height | 92.5" |

In a modified form, the side walls could comprise structural panels instead of tubular members. For example, a laminated panel comprising a foam core and metal, wood or plastic sheets laminated to the core may be use.

In accordance with the invention, the vehicle results from mating a self-contained front wheel drive module with a monocoque designed body that eliminates the conventional vehicle chassis and its relatively high (30 inches or so from the ground) main frame rails.

The elimination of the conventional chassis allows several previously unattainable vehicle features to become possible and functional:

1. A low floor (14 or so inches from the ground), providing single step access and egress from the vehicle, for both the vehicle driver and the cargo loading and unloading;
2. By lowering the floor, a considerable volumetric capacity increase is made possible within the same "profile" as a vehicle constructed on a conventional chassis;
3. Due to the unique design of mating the front wheel drive module to the body of the vehicle, maintenance is dramatically simplified and the attendant "down time" is significantly reduced for the vehicle operator. The design target is for a drive/body system that would allow two trained mechanics to remove and replace the drive module within one (1) working day;
4. The monocoque construction of the vehicle body is designed to provide a relatively lower weight structure with long lived integrity, thus a relatively higher weight load capacity for comparable cost;
5. The front drive module is "packaged" to allow use of readily available gasoline or diesel engines and transmissions, as well as anticipated "alternative fuel" power trains;
6. The design target is to provide a finished vehicle that can be manufactured and profitably sold at a cost and price that is competitive with other "traditional" vehicles presently available on the market;
7. The use of aluminum extrusions and composites (i.e., fiberglass) allows for unique styling possibilities and a minimum of parts fabrication, thus the manufacturing process shall be relatively low in capital equipment requirements.

Thus, the vehicle of the present invention that is substantially more drive and fleet operator "friendly", and much more cost effective than other vehicles on the present market.

The present invention will lend itself to a wide variety of vehicle end uses including:

Delivery trucks;

Passenger busses, including simplified wheelchair assists due to the lower floor;

Ambulances, with much easier loading and unloading features;
Recreation vehicles;
Recent trucks; and so forth.

It can thus be seen that there has been provided a general delivery load carrying vehicle comprising a unitized load and stress bearing monocoque body and a front wheel drive engine module. The body comprises a base floor, side walls and a top wall or roof structurally interconnected to support the vertical and torsional forces on the vehicle. The base floor has a length sufficient to provide a cab area and a load carrying area. The base floor is such as to provide a floor in the cab area that is at the same height throughout and at a level such that persons entering the vehicle may step into the vehicle directly in a single step without the need for additional structural steps or running boards. The side walls have openings adjacent the cab area and define structural pillars for receiving the windshield. The front wheel engine drive module comprises a drive unit frame on which the drive components are mounted including an engine, front wheels, drive axle, cooling components, steering assembly transmission and drive transfer case. The drive unit frame is mounted on the front end of the base floor such that forces due to travel along the road and due to loads are absorbed by the combined strength of the base floor, side walls and top wall. Rear wheels are mounted on the body.

We claim:
1. A load carrying vehicle comprising
   a unitized load and stress bearing monocoque body,
   a front wheel drive engine module including a support frame on which an engine, cooling components, transmission, drive axle and steering assembly are mounted,
   said body comprising a base wall comprising structural members substantially all portions thereof being at the same level,
   side walls comprising structural members,
   said side walls adjacent the upper end thereof have inclined portions such that a windshield can be mounted thereon,
   means connecting each side wall to the base wall along the sides of the base wall,
   means interconnecting the upper ends of the side walls to form a top wall,
   the length of said body being such as to form a driver's area and a load area at the same level, and
   said base wall having spaced portions extending forwardly and defining a space therebetween,
   said drive module extending partially into said space,
   means removably interconnecting the drive module and the body,
   at least a portion of one of said spaced portions defining said driver's area.

2. The load carrying which is set forth in claim 1 wherein said means interconnecting said drive module and said base wall comprising spaced frame portions on said support frame of said drive module extending longitudinally and spaced portions on said base wall, said spaced frame portions on said frame of said drive module being telescopically interconnected to said spaced portions of said base wall.

3. The load carrying vehicle set forth in claim 2 wherein said spaced portions of said base wall and said frame comprises spaced brackets on said base wall telescopically engaging said longitudinally extending portions of said frame of said drive module.

4. The load carrying vehicle set forth in claim 3 including shock absorbing means between said brackets and said support frame of said drive module.

5. The load carrying which is set forth in claim 1 wherein said base wall includes a transverse structural member and shock absorbing means on said transverse member engaging said support frame of said module.

6. The load carrying vehicle set forth in any one of claims 1-5 wherein
   said structural members along a periphery of the base wall comprise tubular members, adjacent members of the base wall and side wall having at least one of said adjacent members formed with flanges into which the other of said members of said base wall and side wall extends.

* * * * *